United States Patent
Kearns et al.

[11] Patent Number: 5,805,798
[45] Date of Patent: Sep. 8, 1998

[54] FAIL-SAFE EVENT DRIVEN TRANSACTION PROCESSING SYSTEM AND METHOD

[75] Inventors: Kevin A. Kearns, Ringwood, N.J.; Teresa R. Jahanian, Ann Arbor, Mich.; Raymond E. Jeffery, Warwick, N.Y.

[73] Assignee: Electronic Data Systems Corporation, Plano, Tex.

[21] Appl. No.: 741,149

[22] Filed: Oct. 29, 1996

[51] Int. Cl.$^6$ .................................................. G06F 11/00
[52] U.S. Cl. .............................. 395/185.01; 395/184.01
[58] Field of Search ..................... 395/180, 181, 395/182.01, 182.02, 182.08, 182.11, 185.01, 185.09, 185.1, 184.01, 200.53, 200.54; 707/200, 201, 204

[56] References Cited

U.S. PATENT DOCUMENTS

| | | | |
|---|---|---|---|
| 4,807,116 | 2/1989 | Katzman et al. | |
| 5,450,601 | 9/1995 | Okuda | 395/200.54 |
| 5,537,642 | 7/1996 | Glowny et al. | 395/800.01 |
| 5,548,750 | 8/1996 | Larsson et al. | 707/204 |
| 5,652,908 | 7/1997 | Douglas et al. | 395/200.01 |

FOREIGN PATENT DOCUMENTS

| | | | |
|---|---|---|---|
| 0 652 519 A2 | 5/1995 | European Pat. Off. | G06F 11/34 |
| WO 96 27157 A | 9/1996 | WIPO | G06F 12/00 |

*Primary Examiner*—Albert DeCady
*Attorney, Agent, or Firm*—Terry J. Stalford; L. Joy Griebenow

[57] ABSTRACT

The system and method of the present invention provide a fail-safe event driven transaction processing for electronic commerce applications. The system includes at least one system node having multiple entities and processes for communicating with outside devices, such as ATMs and financial institutions. Multiple links are provided between the system nodes to provide flexible routing in case of down nodes. A configuration database accessible by the processes provides a backup entity or process for each entity and process. A system monitor resides at each system node monitors the operational status of each node and communicates the status to other nodes.

19 Claims, 6 Drawing Sheets

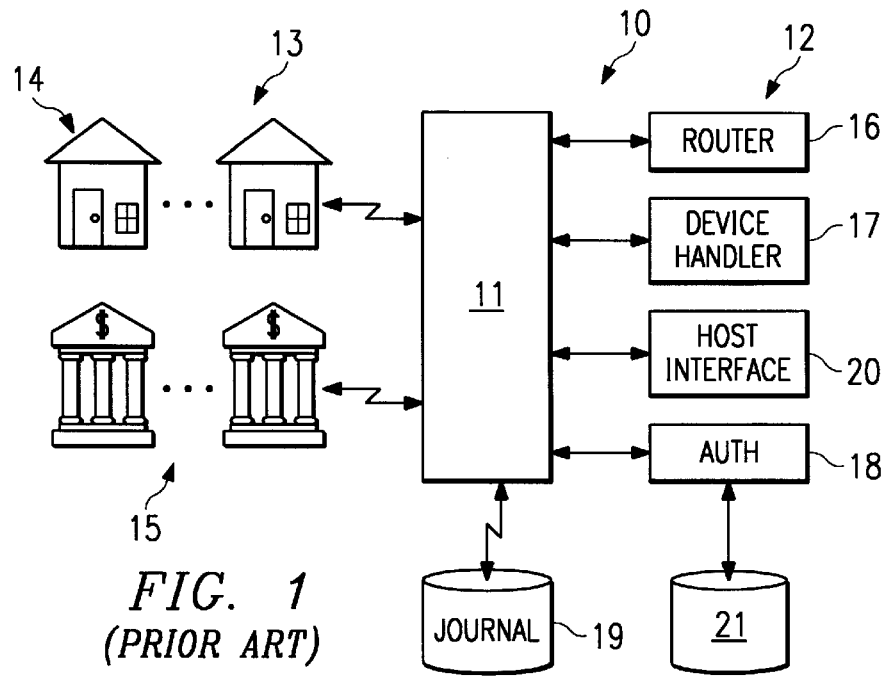
*FIG. 1*
*(PRIOR ART)*
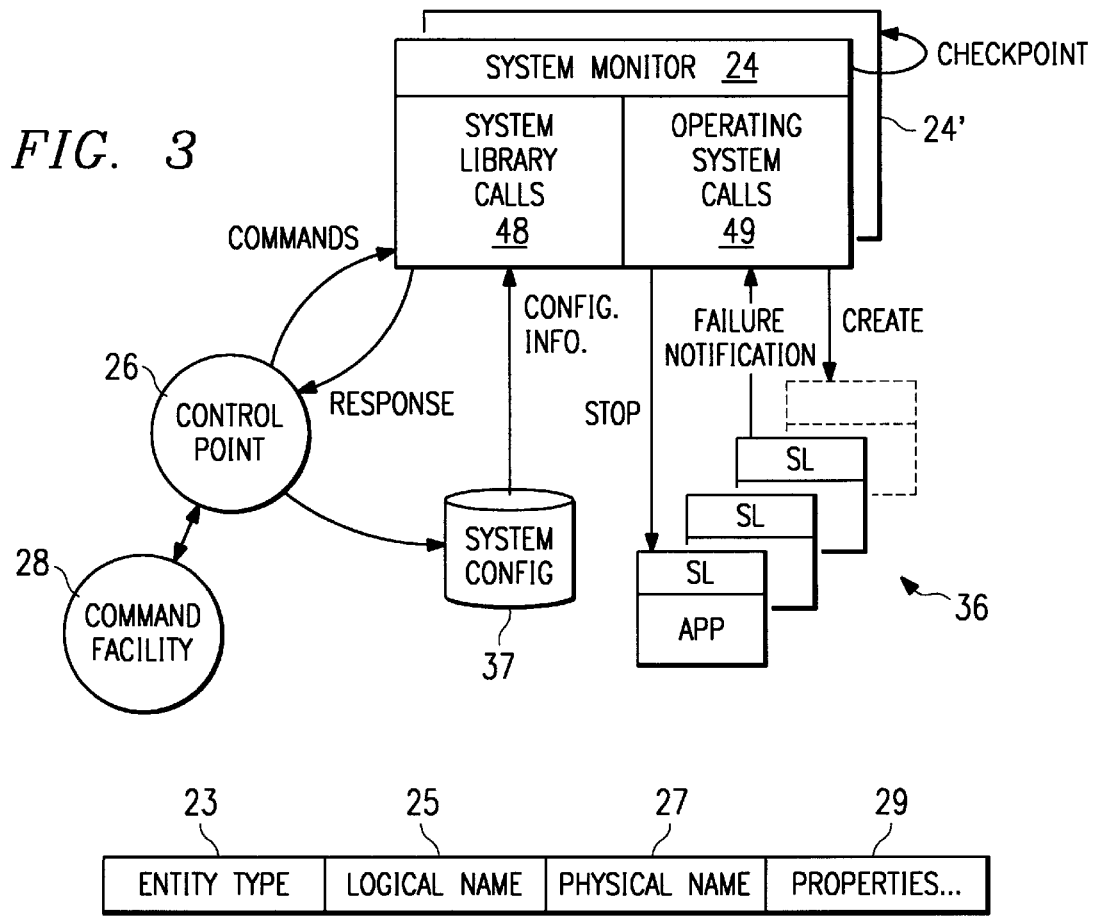
*FIG. 3*
| 23 | 25 | 27 | 29 |
|---|---|---|---|
| ENTITY TYPE | LOGICAL NAME | PHYSICAL NAME | PROPERTIES... |
*FIG. 4*

FAIL-SAFE EVENT DRIVEN TRANSACTION PROCESSING SYSTEM AND METHOD

TECHNICAL FIELD OF THE INVENTION

This invention is related in general to the field of computer systems. More particularly, the invention is related to a fail-safe event driven transaction processing system and method.

CROSS-REFERENCE TO RELATED APPLICATIONS

This patent application is related to co-pending U.S. patent application, Ser. No. 08/741,148, entitled DISTRIBUTED ON-LINE DATA COMMUNICATIONS SYSTEM AND METHOD, filed on Dec. 29, 1996.

BACKGROUND OF THE INVENTION

FIG. 1 is a simplified block diagram of a conventional electronic funds and information transfer (EFIT) system 10 using a conventional centralized communications system 11 that allows a number of application programs 12 to communicate to outside devices 14 remotely located therefrom. For example, outside devices 13 may include one or more automated teller machines (ATMs) 14 and financial institutions 15 in an electronic funds and information transfer (EFIT) system coupled, through centralized communications system 11, to a router application program 16, a device handler program 17, and a funds transfer authorization program (AUTH) 18. Centralized communications system 11 may also be coupled to a journal program and database 19 for logging each transaction, and a host interface process 20 for interfacing with financial institutions 15.

In operation, when a transaction message for a cash withdrawal is generated at an ATM 14, for example, it goes to centralized communications system 11, which sends the transaction message to device handler 17. Device handler 17 then extracts information from the transaction message and builds a message having a predetermined internal format that is understood by application programs 12 and by centralized communications system 11. This reformatted message is then sent back to centralized communications system 11 which then forwards the message to router 16. Router 16 determines the destination for the message and sends the message back to centralized communications system 11 for delivery to the destination. The destination may be authorization program 18, which may access a database 21 to determine whether the transaction is authorized. The authorization contained in a return message is then sent to centralized communications system 11 for delivery to journal 19 to record the transaction, and then returned to device handler 17, again through centralized communications system 11. Device handler 17 then converts the authorization message into an external format and forwards it to the ATM from which the transaction originated through centralized communications system 11. ATM 14 then dispenses the funds requested or denies the transaction according to the information contained in the authorization message.

Where a transaction is required to obtain authorization from a financial institution 15, authorization program 18 would send the transaction message to interface program 20 through centralized communications system 11. Interface program 20 then reformats the message into one that is understood by the authorization system at financial institution 15, and sends the reformatted message to centralized communications system 11 for delivery to the destination financial institution for authorization. The financial institution then generates an authorization message and sends it to centralized communications system 11, which forwards it to interface program 20 for conversion back to the internal format understood by application programs 12 and centralized communications system 11. The reformatted authorization message is then sent to device handler 17 through centralized communications system 11, which then converts the message to the external format as described above to provide the authorization message to the ATM that originated the transaction.

It may be seen from the foregoing that all the messages communicated among application programs 12 and outside devices 13 must go through centralized communications system 11, which is the central controller. As the electronic funds and information transfer system becomes larger and larger to accommodate more and more ATMs and financial institutions, centralized communications system 11 becomes a bottleneck that slows down message delivery and transaction response time. This is a critical problem because transactions of this type typically require an almost instantaneous response time—banking customers do not like to wait more than thirty seconds for the ATM to respond to their cash withdrawal requests. Further, because all communications must go through centralized communications system 11, a single point, failure of system 11 would spell disaster for the entire electronic funds and information transfer system and disable all ATMs in the system.

Centralized communications system 11 has a further disadvantage of being required to recognize the message format in order to determine the destination of the message for routing purposes. Therefore, the message format cannot be easily changed without impacting the major functions of system 11.

The centralized architecture of the system also means that its growth is limited by the capacity of system 11. The system cannot be easily expanded to accommodate an order of magnitude more users without costly addition of computing platforms and other hardware components. In the computer industry, this feature of expandability is called "scalability." Further, a centralized system such as system 11 is not portable to other computing platforms, so that its deployment is restricted to a single platform.

SUMMARY OF THE INVENTION

Accordingly, there is a need for an event-driven transaction processing system that overcomes the disadvantages associated with a system based on a centralized communications systems described above.

In one aspect of the invention, a fail-safe event-driven transaction processing system has at least one system node having a plurality of application processes for processing transactions initiated by a plurality of outside devices. The system is based on a data communications system supplying a plurality of messaging entities and services to the plurality of application processes for routing, transmitting and receiving messages to and from one another. Further included is a system configuration database for storing each entity and process and their respective backup entities. A system monitor which resides at each system node monitors and communicates the operational status of the system node to other system nodes.

In another aspect of the invention, a method for an event-driven transaction processing system records in a system configuration database a logical identifier for each node in the system, a physical address, and status therefor. Further, a backup node is optionally designated for each entity in the system configuration database. Each node polls all other nodes in the system for their status and their understanding of the status of all other nodes in the system. In response to the polling process detecting a downed node, the processing load carried by the downed node is routed to the backup node.

In yet another aspect of the invention, a transaction processing system includes at least one system node having a plurality of processes for communicating with a plurality of outside devices. A configuration database is accessible by the processes, which stores the logical names of the processes and outside devices and their corresponding physical addresses. A system library further supplies a plurality of routines to the processes for transmitting and receiving messages to and from one another. At least one application process uses the processes and system library for communication with the outside devices for processing transactions.

BRIEF DESCRIPTION OF THE DRAWINGS

For a better understanding of the present invention, reference may be made to the accompanying drawings, in which:

FIG. 1 is a simplified block diagram of a conventional electronic on-line communications system using a centralized communications system;

FIG. 3 is a block diagram of the exemplary system monitor's external interfaces to a control point, the operating system, and applications;

FIG. 4 is a diagram of an exemplary record structure in the system configuration file;

DETAILED DESCRIPTION OF THE INVENTION

Figure 2:
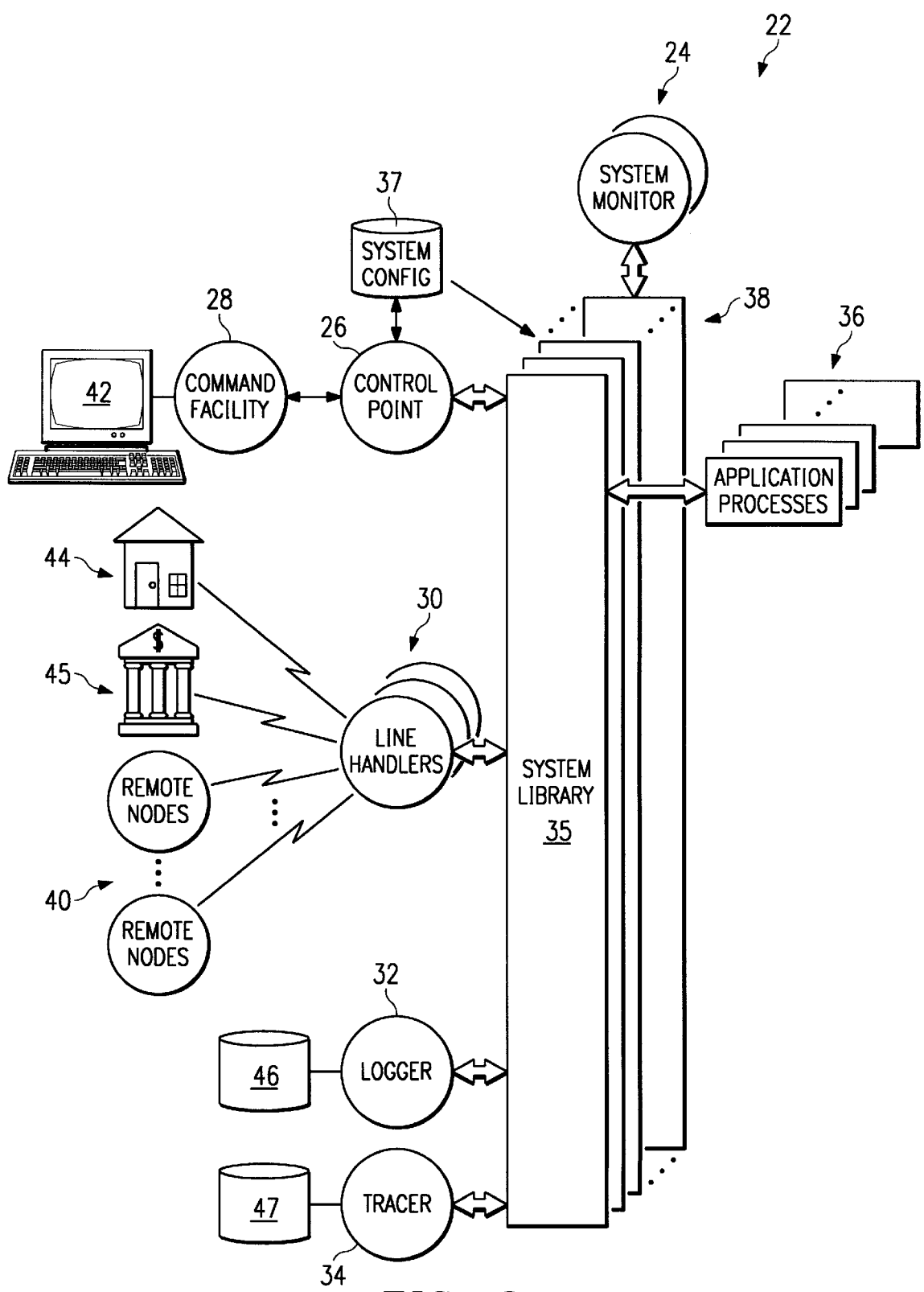
FIG. 2 is a simplified block diagram representation of a distributed on-line data communications system constructed according to the teachings of the present invention.

The preferred embodiment(s) of the present invention is (are) illustrated in FIGS. 2–14, like reference numerals being used to refer to like and corresponding parts of the various drawings.

Referring to FIG. 2, a simplified block diagram of a distributed on-line data communications system 22 is shown. Distributed on-line data communications system 22 may support application processes implementing a variety of event-driven applications, including electronic funds and information transfer (EFIT), point of sale (POS), electronic health care and benefits transactions, or any message-based transaction processing application. System 22 includes a number of processes, including a system monitor and its backup 24, a control point 26, a command facility 28, line handlers 30, an event logger 32, and a diagnostic tracer 34. System 22 further includes a system library 35 which contains a set of routines that is used by all system processes and all application processes 36.

System library routines 35 provide interface procedures for performing basic functions and are preferably bound or compiled with system and application processes. FIG. 2 illustrates this coupling between system library routines 35 and system monitors 24, control point 26, line handlers 30, logger 32, tracer 34 and application processes 36 as an open pipeline to distinguish it from I/O as in the centralized communication system 11 described above. System library functions include sending, receiving, routing, queuing, logging, and tracing messages. System library 35 enables application processes 36 to communicate with one another and to the outside world. System library 35 preferably maintains a private data structure in memory that contains the information necessary to perform the routing and receiving services for application processes. Each application process has its own copy of the library data. Therefore, each application process also has its own view of the processes with which it communicates. This library data is dynamic, depending on the links to other processes that the application creates and discards. The library data may include environment variables, buffers for reading in messages, and a table listing all open processes that can send and/or receive messages. In addition, there are queues containing messages to be sent to each destination.

System 22 is especially valuable for event-driven applications. A message arrival, a timeout, a message failure, an I/O completion are examples of events. To recognize an event, an application calls a system library procedure RECEIVE. System library 35 performs environment and operating system specific tasks to determine what the event is, then gives a value for the type of event and the data associated with the event to the application. The following algorithm shows an exemplary main loop of an application program that uses this method:

```
While not time to stop
    Call RECEIVE
    Switch on EVENT-TYPE
        if MESSAGE, process message
        if COMPLETION, process completion
        if FAILURE, process failure
        if TIMEOUT, process timer
        otherwise, process unknown event
    end switch
end while
```

Environment specific tasks may include de-blocking a message or checking the queues for more messages to send. Operating system specific tasks may include interfacing with the operating system to receive messages from another program, or interpreting an operating system error. These tasks are performed transparent to applications 36.

System monitor 24 is a process running non-stop in order to monitor all system processes and restart any that goes down, including control point 26. System monitor 24 may poll processes it monitors for status information and receive acknowledgments therefrom. As is also shown in FIG. 3, system monitor 24 accesses a system configuration database 37 via system library calls 48 for process configuration information. To operate system monitor 24 non-stop, a backup process 24' is provided which runs in parallel with system monitor 24. System monitor 24 also uses operating system calls 49 to create new instances of application processes, stop an instance of an application, and for receiving failure notifications from application instances. System monitor 24 preferably checkpoints critical information and transactions to its backup process 24'. If the primary system monitor fails, the backup process takes over and continues from the last checkpoint. Operators may control system monitor 24 through control point 26 via command facility 28. System monitor 24 may be configured to monitor only processes at its own node 38, to also monitor processes at one or more other selected nodes 40, or to monitor all the processes running at all nodes in the system depending on the application.

As shown in FIG. 2, system configuration database 37 contains data on all processes in system 22, which may include their logical names, physical addresses, backup process identities, and other properties. The contents of system configuration database 37 may be modified by commands from command facility 28. System configuration database 37 may be accessed remotely, replicated at other sites, or distributed across multiple sites, depending on the application needs.

System configuration database 37 contains several records, where each record contains information on an entity in system 22. As shown in FIG. 4, information in a record about an entity may include an entity type 23, a logical name 25, physical name 27, and properties 29 unique to the entity type. Entity type 23 is the type of record or entity; logical name 25 is the name by which applications access this entity; physical name 27 is the system name and location of the entity; and properties 29 are information specific to the entity type being defined in the record. Where desirable, properties 21 may provide information on the entities that serve as backups to each entity.

There are several different entity types in system 22, including but not limited to: SYSTEM, PROCESS, LOGICAL UNIT, PHYSICAL UNIT, LINE, USER, TERM, FILE, ROUTE, NETWORK, COMMAND, NODE, GROUP, PARAMETER, and ASSIGN. Each entity type is described in more detail below.

The SYSTEM entity contains information related to a site or node in the system. Therefore, system configuration database 37 may include several SYSTEM entity records containing paths of communication and other information related to all the nodes in the system that can communicate with one another.

The PROCESS entity contains information that defines a process to the distributed on-line data communications system. An application that runs on the platform is referenced by its logical name. The physical name includes the running process identifier. The properties section defines the location of the object and the resources a process uses and provides information that allows the running process to be created.

Figure 5:
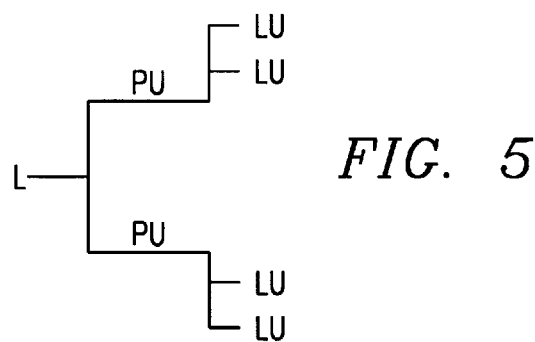
FIG. 5 is a diagram of an exemplary communications configuration.

The LOGICAL UNIT (LU) entity is the most elementary form of a communications circuit. It describes the tail end out to a particular device. When a process references an LU by its logical name, the message gets routed to its line handler 30. The LU has links through optional PHYSICAL UNIT (PU) entities that terminate at a LINE (L) entity as shown in FIG. 5. Line handler 30 (FIG. 2) uses the hierarchical information of LU,PU,LINE to get the address of the destination device. The physical location of the device is described by the physical names of the LU, PU and LINE entities that are linked together. Therefore, properties of LU includes the line handler name and the links. Other properties of the LU entity define the protocol of the LU and protocol options. An LU can be used to define a communications path to an external source, such as institutions 45 and ATMs 44 or to other distributed on-line data communications system nodes 40 (FIG. 2).

The PHYSICAL UNIT entity (PU) is an entity that allows a network designer to create a collection of one or more LUs. It is a logical division of a LINE entity. The configuration of communications often naturally follows the hierarchy shown in FIG. 5. A PU entity is a means of indicating that hierarchy which takes advantage of available bandwidth in communications. The logical name of the PU is specified to access it (such as on an LU's link chain). The physical name contains routing information for accessing an LU (a partial address). Properties include the protocol and a link to other entities which could be more PUs, but must terminate at a LINE entity.

The LINE entity defines a port on the physical equipment from which one or more multiple devices can be accessed via a communications circuit. The logical name of a LINE is specified by the LUs and PUs linked to it via the link field. The physical name describes the machine's or communications device's port name. Properties include the line handler program, protocol and protocol options.

When a line handler 30 receives a message for an LU, it has already chained the entity information together. A general algorithm for routing is used to access the port described in the LINE record, use the segment of the line described by the PU record (if present), and the address on the LU record to transmit the message to the device at the end of the circuit.

The USER entity describes a valid user of the distributed on-line data communications system 22. It functions primarily as a security measure or for guarded access to the system. For terminals in a secure area, it may be set up so that any user is valid. These terminals are defined in the system configuration database 37 as TERM entities.

The FILE entity defines a file to system 22 and its applications. It also has a logical name and a physical location. Accessing a file by a logical name allows for transparency of machine and location for a distributed system. An application accesses a file by specifying its logical name, system library 35 (FIG. 2) then determines the physical name and its properties and provides the access services and information to the application.

The ROUTE entity is a generic entity provided by system 22 to be used by the application library (to be described below in conjunction with FIG. 6) or applications 36. In this record type, a logical name is specified and a related "handler" is specified. The handler is a process entity. The handler process is an application programmed to recognize a message from the ROUTE source and process it accordingly. When an application indicates a ROUTE entity as a destination, system library 35 automatically routes it to the handler process. This feature is useful when an application has a named command that is global to all processes in the system. This implementation of a global destination (by using a ROUTE entity) keeps the system platform generic so that system 22 does not have to know the specifics of an application and allows flexibility in the application.

The NETWORK entity is a convenient means for describing the physical network that provides communications for a system. It does not affect routing but describes the hardware that make up the distributed system.

The COMMAND entity allows an operator to customize the user interface for application specific commands. A COMMAND entity consists of a logical name and a physical name (which is the text of the command), and the destination for the command. An example of such a command is when an application must obtain new keys for security. A COMMAND entity called KEYS is defined in system configuration file 37, which is used by an operator to inform the application process to obtain new KEYS.

The NODE entity defines a computing node in system 22. A computing node is a set of one or more tightly coupled physical processors. The configuration of a node is hardware independent, so that it may be a set of CPUs or a workstation. Therefore, an application can be freed of knowing about it by accessing the logical name of the node. The properties of a node include an indicator of the up or down status of that node. The NODE entity is specified as a time-sync node in the SYSTEM entity. In this manner, all transactions in system 22, even though distributed across multiple nodes, can be synchronized to the same clock. Clock synchronization provided by the combination of configuring the SYSTEM record with a time-sync node and with a system library procedure called SYSTEM TIME.

The GROUP entity allows for logical groupings of entities in system configuration database 37. It provides a necessary convenience for monitoring and operating a large distributed system. When a group name is indicated for an operation, all entities in that group are operated on.

The PARAM entity allows variables in the environment for application programs to be defined external to the program, so they can be modified. A PARAM consists of a logical name and a value. When an application program needs an environment variable, it invokes a procedure from system library 35 which returns the value of the parameter. An example would be a PARAM with the logical name SECURITY and the value ON.

The ASSIGN entity is also used to describe the environment for application programs. It defines files external to the program, so they can be changed. An ASSIGN consists of a logical name and a file name or FILE entity. When an application program needs a file for processing, it invokes a procedure from system library 35 which returns the file name or FILE entity.

Also shown in FIG. 2 are command facility 28, an interface to the operators, and control point 26, which is a controller and administrator of the respective site or node of system 22. Command facility 28 may be in communications with a data entry and display device 42, such as a terminal, computer, or workstation, and may be linked via telecommunications lines or computer networks to control point 26. Command facility 28 may provide a graphical and/or textual user interface to the operators for receiving commands and displaying system status.

Figure 10A:
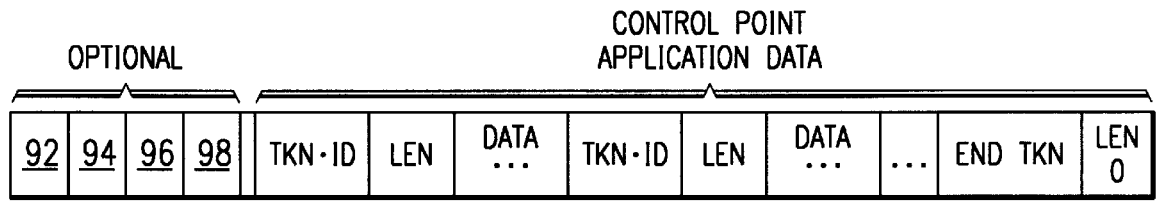
FIGS. 10A and 10B are diagrams of exemplary message structures used between a control point and other processes.
Figure 10B:
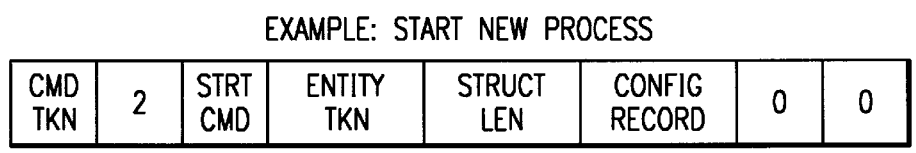

The primary function of control point 26 is to handle requests from command facility 28 to configure, monitor and control entities in the local node. It is the sole maintainer of system configuration database 37. Control point 26 is in communications with all the processes at the local node and is the central transmitter of commands and collector of information to be returned to command facility 28 for display. Control point 26 communicates with all processes via a flexible, extensible, token-oriented message standard such as shown in FIGS. 10A and 10B, described in detail below, thus allowing for interface with command facilities on multiple platforms. Command facility 28 is responsible for formatting and presenting information relayed by control point 26 in a manner that is appropriate for the chosen platform in a graphical and/or textual display format. Command facility 28 and control point 26 further function together to provide security against unauthorized access to the system as defined by USER entity records contained in system configuration database 37.

Line handlers 30 are processes that are responsible for data communications with outside devices, such as but not limited, to ATMs 44, banking institutions 45, and other nodes 40 of distributed on-line data communications system 22. An ATM 44 is defined, for the purpose of the present invention, as a dedicated terminal having a data entry device and screen display that receives and processes transactional requests from banking customers, such as cash withdrawal, deposit, balance inquiry, etc. Line handler 30 may be specialized to operate in accordance to specific communications protocols, such as Bisync, X.25, TCP/IP, SNA, and others. Further, line handlers 30 may include bridge processes to foreign systems. More than one line handler process 30 may be in execution concurrently to provide communications to a large number of outside devices.

Event logger 32 is a logging process which receives messages destined for a log file 46 and may perform some filtering functions. The logged messages may be retrieved by entering appropriate commands at command facility 28 or at the operating system level. A system library process is provided to format the logged messages.

Tracer 34 is a process that collects messages communicated between selected processes in the system and stores them in a trace file 47. An operator may initiate tracing and select the processes, the type of messages, and other trace parameters through command facility 28 or at the operating system level. A system library process is provided to format the traced file. Further, the stored messages may be retrieved from file 47 by commands entered at command facility 28.

Figure 6:
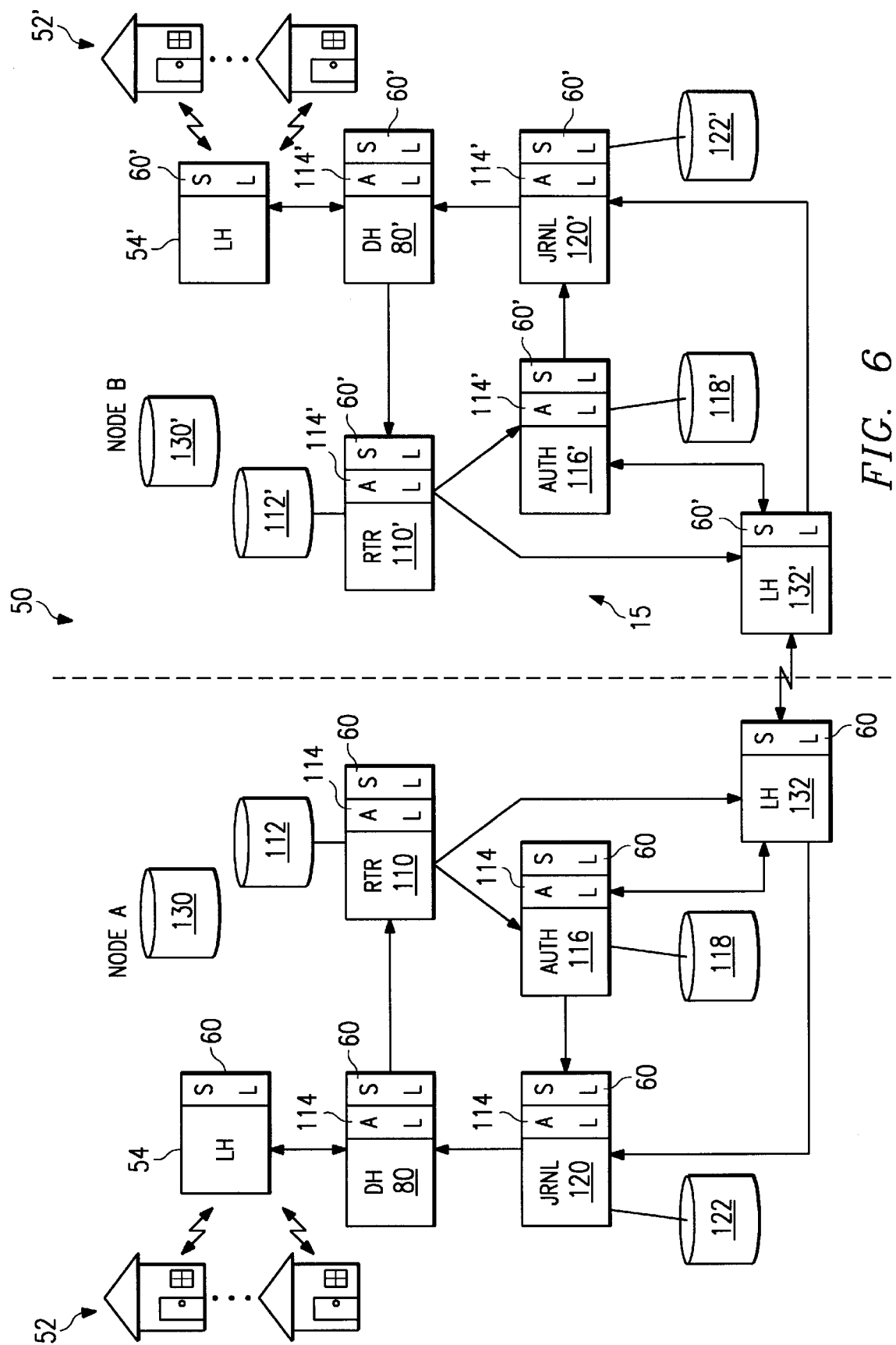
FIG. 6 is a simplified diagram of a distributed on-line data communications system being utilized in an exemplary electronic funds and information transfer application.

Referring to FIG. 6, a simplified block diagram illustrating the process flow of an exemplary fail-safe event-driven transaction processing system is shown. FIG. 6 specifically depicts the process flow for an exemplary electronic funds and information transfer (EFIT) application built on a distributed on-line data communications system 50 constructed according to the teachings of the present invention is shown. Distributed on-line data communications system 50 may include multiple nodes located remotely from one another, cross-country, continent, and/or globe. For example, in a two node system, Node A may be located in Chicago, Ill., and Node B may be located in Plano, Texas. In an EFIT system, Node A and Node B may represent regional processing centers.

When applied to EFIT, a transaction may be initiated by a transaction acquirer such as an ATM 52 being operated by a banking customer, for example, where the ATM is directly coupled to Node A of distributed on-line data communications system 50. The customer may, for example, initiate the transaction by inserting a card issued by a banking institution that contains a unique card number and associated data concerning the customer's account. The customer further enters the type of transaction desired, such as deposit, withdrawal, or balance inquiry, and the associated dollar amount, if required. The customer's desired transaction, card number, and line and device names/numbers of the ATM are packaged into a transaction message having a first predetermined format and communicated to a line handler (LH) 54.

Figure 8:
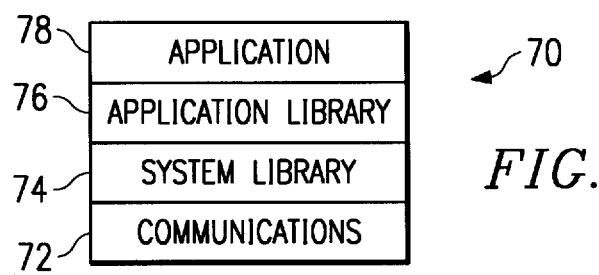
FIG. 8 is a diagram of an exemplary multi-layer architecture of the distributed on-line data communication system of the present invention.

Coupled to line handler 54 is a set of system library (SL) procedures 60. System 50 may be thought of as having a multi-layer architecture 70, as shown in FIG. 8. The bottom-most layer, communications layer 72, represents the data communications equipment, lines, and protocols used by line handlers 54 to communicate to outside devices. On top of communications layer 72 is a system library layer 74, which corresponds to the functions performed by the set of system library procedures 60 and databases used thereby. System library layer 74 provides messaging services that are independent from the hardware and communications protocol in communications layer 72. Above system library layer 74 is an application library layer 76 which contains additional messaging services and databases specific to the application. The top-most layer is an application layer 78 which includes application programs to perform specific functions such as EFIT. It may be seen that system library layer 74 frees application layers 76 and 78 from reliance and tight coupling to the hardware and protocols of communications layer 72 to provide a portable and hardware independent interface. Referring to FIG. 6, system library layer 74 are shown as system library procedures (SL) 60 bundled with all the processes, including processes in application library layer 76 as well as processes in application layer 78. System library procedures 60 may be code that is compiled with the code of each process. Alternatively, system library procedures 60 may be contained in a run time library that can be called by all the processes.

Figure 7:
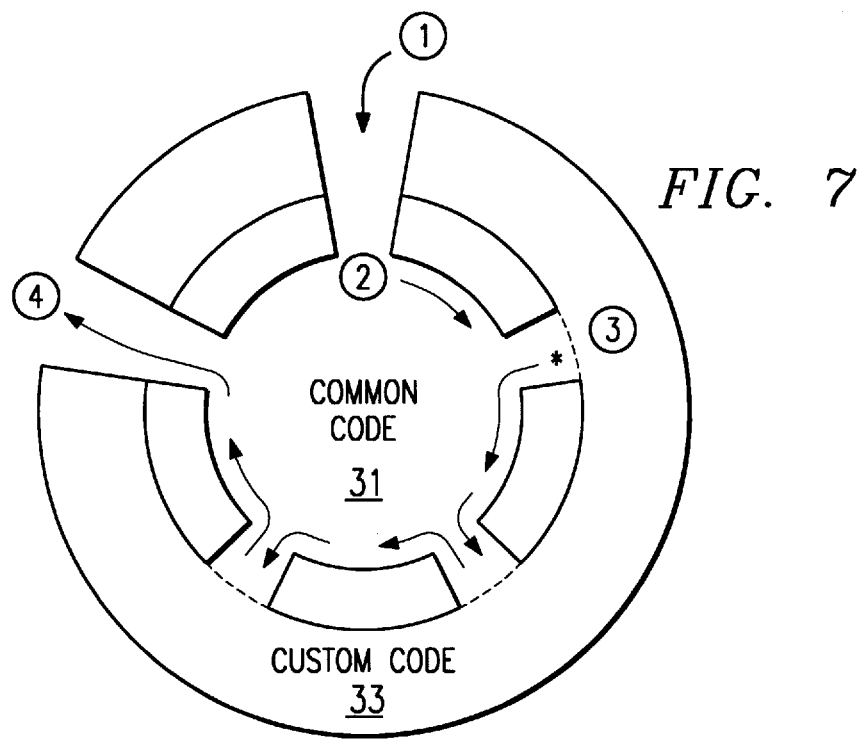
FIG. 7 is a diagram depicting the architecture and process flow of line handlers according to the teachings of the present invention.

In FIG. 6, line handler 54 receives a transaction message from the ATM as the customer initiates a transaction. Referring to FIG. 7, additional details of line handler process 54 are shown. In FIG. 7, the arrows depict process flow in a common code (kernel) 31 and custom code 33 of line handler process 54. A request is first received to operate on an LU, such as start, stop, or transmit. The line handler operates on the LU common code 31 by first finding the LU in a status table, then calling custom code 33 to execute the protocol-dependent functions at appropriate points in the processing. The status table provides the up/down/suspended status information about LUs and entities and is part of a global set of information maintained by common code 31. Custom code 33 of the line handler then modifies (if necessary) the message processing based on the protocol, and returns control to common code 31. The line handler common code 31 then performs I/O to the device such as the ATM, at the calculated address. Alternatively, the I/O to the device may be performed by custom code 33. The particular ATM from which the transaction originated has a predefined destination or device handler (DH) 80 for all of its transaction messages predefined in system configuration 37 as in FIG. 2. Device handler 80 receives the message and reformats the message into a second predetermined format that is internal to system 50 and shown in FIG. 9.

Figure 9:
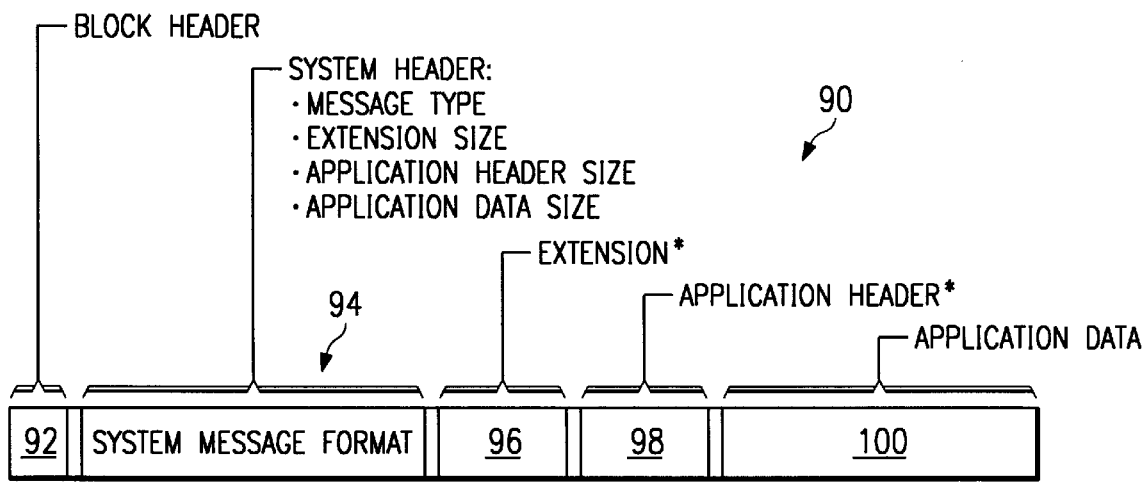
FIG. 9 is a diagram of an exemplary system message format according to the teachings of the present invention.

FIG. 9 provides an exemplary format 90 for messages transmitted in distributed on-line data communications system 50. Message format 90 includes a block header 92 which may include information about the block of data that follows, such as the number of messages in the block, the relative offset to the beginning of the first message in the block, and the total number of bytes of messages in the block. Block header 92 may also include an identifier that identifies the data as a message having a format recognizable by system 50. What follows block header 92 is a system header 94, which may contain multiple fields. System header 94 may include information such as an identifier indicative of the type of message, a source entity name, and a destination entity name. All processes and databases in system 50 are each assigned a unique logical identifier or name. The logical identifier is assigned and used by system library 60 to address all messages and identify the source and destination of the messages. System header 94 further includes an extension size, an application header size, and application data size. Extension size provides the flexibility to extend the size of system header by an optional extension field 96, if necessary. Application header size indicates the size of application header field 98, which may be used in any manner by application library and application layers 76 and 78 (FIG. 8) and may be optional. Message format 90 also includes an optional application data field of variable length. The asterisks (*) appended to the message fields in FIG. 9 indicate whether the fields may be optional. It may be seen that the exemplary message format is generic and allows different types of applications to utilize the system.

FIG. 10A provides an example of a message using the format shown in FIG. 9 for control point application data. The message may have fields block header 92, system header 94, and optional extension 96, optional application header 98 and optional application data 100. In addition, the control point application data may include a number of token identifiers (TKN ID), their respective lengths (LEN), and associated data. The message terminates with an end token (END TKN) and length 0 to indicate the end of the message. In practice, as shown in FIG. 10B, to start a new process, the message may include a command token (CMD TKN) with its length, and its associated data being the start process command (STRT CMD). The next token identifier is the entity token (ENTITY TKN), its length, and the system configuration database record information related to the entity or process being started. The command token, start command, and entity token may be integer values, alphanumeric strings, or any other suitable representation. Note that in FIG. 10B, the optional fields 92–98 have been omitted.

Figure 11:
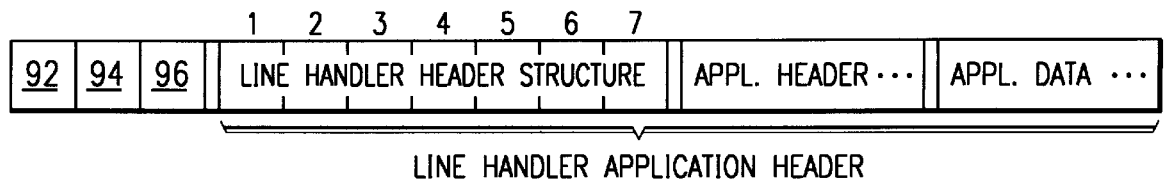
FIG. 11 is a diagram of an exemplary message structure used between line handlers and applications.
Figure 12:
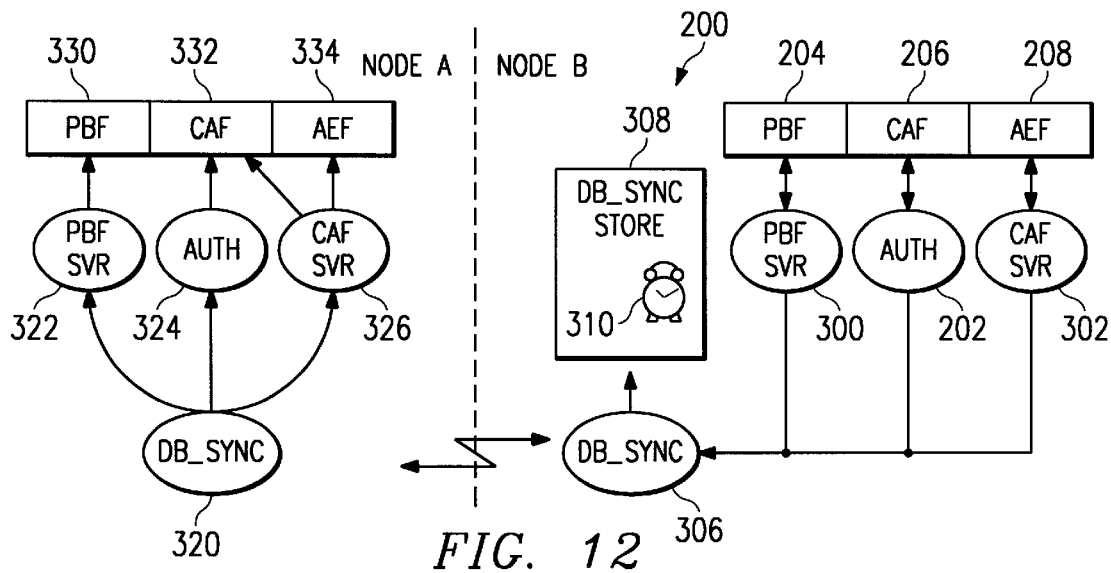
FIG. 12 is a block diagram illustrating a database synchronization process according to the teachings of the present invention.
Figure 13:
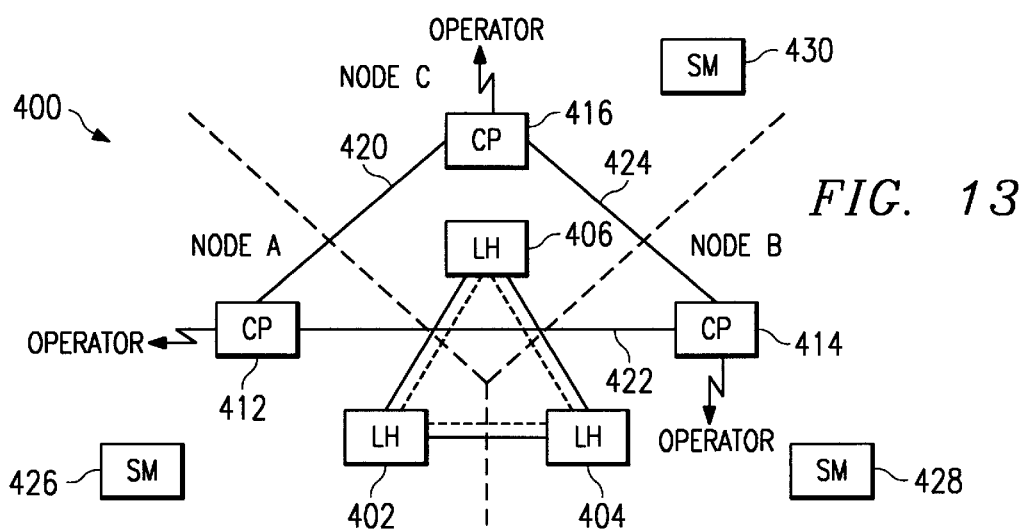
FIG. 13 is a block diagram illustrating an exemplary process for detecting and handling general failure at a node.
Figure 14:
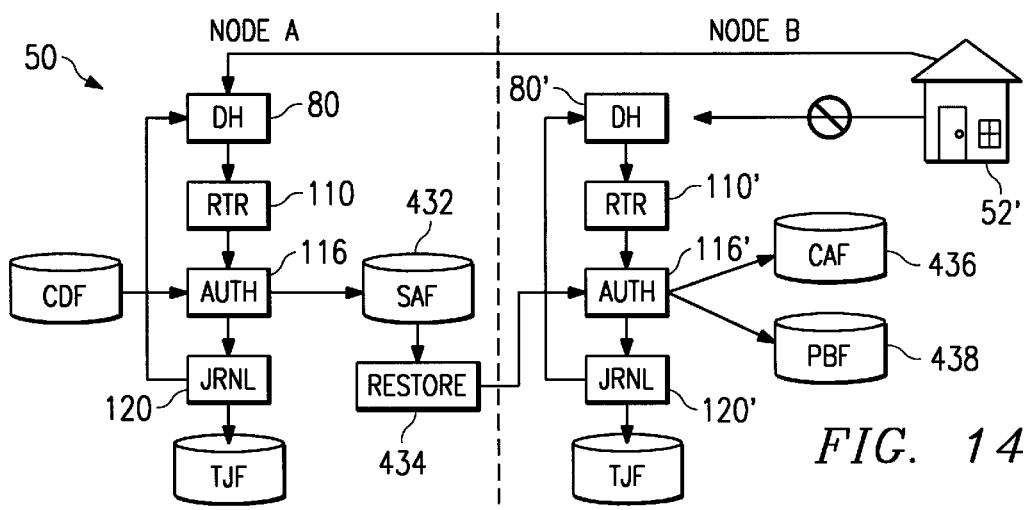
FIG. 14 is a block diagram illustrating an exemplary process for backup processing and restoring the primary node.

Referring to FIG. 11, an exemplary message structure used for communications between line handlers and application processes is shown. In the line handler application header portion, a number of fields are used to provide data on the message. For example, the line handler application header may include a message type field to indicate whether the application data contained in the message is data or information related to a command. One or more timestamps may also be provided for statistical analysis and timing purposes. An error code may also be contained in the line header application header to indicate the nature of an error that has occurred. Further, an internal identifier used to identify the destination of the message may also be included.

Continuing the process flow shown in FIG. 6, device handler 80 calls a system library procedure called SYSTEM SEND to deliver the transaction message received from line handler 54 to another process, router (RTR) 110. Router 110 is accessible to an ATM database 112 that contains information about the acquirer network, the ATM card numbers and the respective financial institution owners of the bank cards, and the ATM networks that the respective bank cards have permission to access. Accordingly, router 110 looks up the card number contained in the message and determines that the customer may access this particular ATM network, and further obtains the logical identifier of the process, AUTH01, that may authorize the transaction in question. Having obtained the logical identifier of an authorizer (AUTH) 116, router 110 calls APP SEND and specifies in the message that the authorizer destination (AUTH_DEST) is AUTH01. APP SEND may be part of application library layer 76 (FIG. 8) which provides a set of application library procedures 114. Application library 114 then receives the message and calls SYSTEM SEND with the AUTH01 destination. SYSTEM SEND recognizes AUTH01 as a local authorizer program 116, and delivers the message to authorizer 116. The message may be queued until authorizer 116 pulls it from the queue to receive it. The queue resides in the system library private memory of the sender process.

Authorizer 116 then examines the message, and accesses a database or card definition file 118 for information needed to determine whether the requested transaction is authorized. Authorizer 116 then generates an authorization message and calls APP SEND to deliver the message. Authorizer 116 may specify in the message one or more destinations for the message, such as RETURN_AND_JOURNAL_DEST, which specifies that the message is to be returned to the originator and logged by the appropriate journal process. In a predetermined field in message format (FIG. 5), additional destination logical entity names may be specified. Therefore, authorizer 116 may include a journal (JRNL) 120 as a first destination and the originator of the message as the second or next destination in the message. Application library (AL) 114, upon examination of the message, resolves the first destination (JOURNAL_DEST) as journal 120 and writes the message thereto. Journal 120 then records the transaction in a designated file in a database 122, and calls APP SEND with what is specified as the next destination (NEXT_DEST) in the message. Application library 114 resolves the next destination as the originator of the transaction message or the return destination (RETURN_DEST), which is device handler 80. Application library then calls SYSTEM SEND to deliver the message to device handler 80. Device handler 80 sends message to line handler 54, which then delivers the message to ATM 52. ATM then acts upon the received message, either performing the requested transaction or denying the requested transaction.

In the above scenario, a requested transaction is authorized locally at the same node, Node A. However, a transaction requested at Node A may alternatively be authorized at a remote node, Node B by communicating the transaction message to Node B. For example, when router 110 receives the message from device handler 80, and looks up the card number in its database 112, router 110 obtains from database 112 a logical identifier of the process that can authorize the transaction, for example NODEB.AUTH01. Router 110 then calls APP SEND to deliver the message. Application library 114 then gets NODEB.AUTH01 from the message and calls SYSTEM SEND with this parameter. System library 60 notes the foreign system name, looks up the system name in a system configuration database names kept in memory for efficiency and performance 130 by calling a system library routine, and obtains the logical address of the communications port to Node B and its line handler 132. Configuration database 130 preferably stores the logical names and corresponding physical addresses of all system processes and hardware. Operating in this manner, processes need only know the logical names of other processes they interact with, and it is system library's function to keep track of the corresponding physical location or addresses and to ensure proper delivery of messages.

System library 60 then appends the real or physical destination address to system header 94 (FIG. 9) in the message as a next destination (NEXT_DEST) and queues the message to line handler 132, which passes the message on to a line handler 132' at Node B. It may be seen that messages may be passed between line handlers 132 and 132' via computer networks, telecommunication networks, wireless networks, satellite communications and the like.

At Node B, line handler 132' gets the message and forwards it to the next destination (NEXT_DEST) specified in the message, which is NODEB.AUTH01 or authorizer 116'. Authorizer 116' authorizes the transaction and calls APP SEND to return an authorization message and record the transaction in one or more journal databases (RETURN_AND_JOURNAL_DEST). Application library 114' determines the journal destination (JOURNAL_DEST) to be a journal process, and further notes the originator of the message as Node A, so it calls SYSTEM SEND specifying the destination as NODEA.JOURNAL. SYSTEM SEND then queues and writes the message to journal 120 at Node A. System library 60' notes the foreign system name of NODEA, looks up the system and determines the logical name of the communication port to Node A. System library 60' then appends the real destination address of journal 120 at Node A to system header 94 in the message as the next destination (NEXT_DEST). System library 60' further looks up line handler 132' for the communication port to Node A and queues the message thereto. Line handler 132 gets the message and forwards the message to NODEA.JOURNAL 120, which is specified as the next destination. Journal 120 then receives the message and writes to its database or transaction journal file 122. Journal 120 further calls APP SEND and specifies a next destination (NEXT_DEST). Application library 114 resolves the next destination as the return destination (RETURN_DEST), which is specified in the message as device handler 80. SYSTEM SEND then queues and writes the message to device handler 80, which relays the authorization decision to the ATM 52. The ATM then either carries out the requested transaction or denies the transaction, depending on the authorization in the message.

There are many possible scenarios associated with different applications such as EFIT, where distributed on-line data communications system and method 50 are equally applicable. For example, a host (not shown), such as a banking institution, may be required to authorize the transaction. A host interface may be used to interface with the host. Further, a card holder may access the ATM card network at a first node, where the transaction is required to be authorized at the host at a second node, but the host interface may exist at a third node. Therefore, the transaction message must be relayed from the first node to the second node through the third node. Similar system library and application library processes may be used to complete this transaction.

Distributed on-line data communications system and method 50 according to the teachings of the present invention are constructed to provide database duplication in the event of system failure at one or more nodes. Referring to FIG. 6, a block diagram of the exemplary database duplication or synchronization system and process 200 is shown. Again, an EFIT application is used to illustrate system 200. When some event causes a change in a selected number of files or databases, this change is forwarded to the backup database to update its records. For example, when an authorizer 202 authorizes a transaction that changes the account balance of an account stored in a positive balance file (PBF) 204, the change is packaged in a message and sent to a DB_SYNC process 306. When a customer account file (CAF) 206 record is updated, authorizer 202 also sends the updated information in a message to DB_SYNC process 306. Similarly, a change to an account exception file (AEF) is sent by a file server process, CAD SVR 302, to DB_SYNC process 306.

The delivery of the update data message is performed by calling the system library routine, SYSTEM SEND. The message may contain a logical identity of the backup system or node, the record type, and the data changed. DB_SYNC process 306 then writes the message to a DB_SYNC store file 308 and also uses SYSTEM SEND to forward the message to a DB_SYNC process 320 on the designated backup system, Node A. Recall that system library 60 may access system configuration database 130 to determine the physical address of the destination system. A timer 310 may be started to keep track of the elapsed time. DB_SYNC store file 308 functions as a temporary storage for transactional data that requires duplication at the backup node. It may be seen that a similar line handler process, as shown in FIG. 3, may be used to deliver the message to remote nodes.

DB_SYNC process 320 at Node A receives the message and forwards the message to the server indicated by the record type contained in the message, including PBF SVR 322, AUTH 324, or CAF SVR 326. The appropriate server then stores the transaction data in the message to the respective file or database 330–334. DB_SYNC process 320 at Node A may send an acknowledgment message to DB_SYNC process 306 at Node B at the receipt of the message or after the transaction data is successfully stored in the proper file. Upon receipt of the acknowledgment message, DB_SYNC process 306 deletes the corresponding message from DB_SYNC store 308. If at the time timer 310 times out the acknowledgment message is not yet received by DB_SYNC process 306 from the backup system, then DB_SYNC process 306 may retrieve the message stored in DB_SYNC store file 308 and retransmit it to the backup system. The retransmitted message may include a field to indicate that this is a second transmission of a previously sent message.

Constructed in this manner, each system at a node is assigned a backup system or multiple backup at another node, and the data stored in the databases related to transactions are duplicated. Accordingly, selected files or databases between the primary and the backup systems are synchronized so that they contain substantially the same data. It may be determined that certain transactions are essential to the operations of the system, for example dispensing cash, so that only databases and files associated with this transaction are duplicated. For example, account exceptions file 208 may be duplicated because it records ATM cards that have been lost or stolen and may come into unauthorized use; positive balance file 204 provides accounts that have sufficient balance to support the dispensing of cash; and customer account file 206 contains customer account information. It may be seen that database synchronization is not limited to these databases and files shown in FIG. 6.

Referring to FIG. 7, a simplified block diagram illustrating an exemplary process for detecting and handling general failure of a node is shown. A distributed on-line data communication system 400 in this instance includes three nodes, Nodes A, B, and C. Communication between the nodes is accomplished by line handlers 402–406 connecting to one another as specified in system configuration database 130 (FIG. 3) of each node. It may be seen a backup connection, shown in dashed lines, is also provided between line handlers 402–406. Each link, primary and backup, is represented by a logical unit. When messages communicated between line handlers 402–406 fail to be received within specified time constraints, the backup link is used for communications between the line handlers. If both the primary and backup links fail and continue to be down, control points 412–416 of the nodes may communicate via a link 420–424 coupled therebetween to continue to provide operators located at any node to access other nodes, including the node with failures.

Each node also has a system monitor 426–430, which performs a handshaking protocol with the system monitors of other nodes. Each system monitor sends a handshake message to all other system monitors in the system. The handshake message preferably includes the sender monitor's view of the status of all the nodes in the system. When a system monitor receives a handshake message from another node, it compares the status contained in the message with its own data about the status of all the nodes. System monitors from two or more nodes must agree that a node is potentially down before that node is pronounced as down. For example, if the message from system monitor 426 of Node A has marked Node B as potentially down, and the message from system monitor 430 of Node C has also marked Node B as potentially down, then an agreement has reached as to the status of Node B, and it is marked as being down. A system monitor marks a node as being potentially down when it has communications problems with that node via the primary and backup links, when it is unsuccessful in exchanging handshake messages with the monitor at that node, or when it gets a handshake message from that node with a request to "Mark me down." This last scenario may occur when the node is taken off-line temporarily for maintenance by an operator.

A more detailed description of the handshake process is as follows. System monitor 426 at Node A reads from the system configuration database to obtain the logical names for the system monitors at other nodes in the system, which identify system monitors 428 and 430. System monitor 426 then sends a handshake message to system monitor 428 at Node B. The handshake message contains its own status but no site token. The site tokens are used to communicate the status of other nodes. At the same time system monitor 426 sends the handshake to Node B, it also sets an interval timer. System monitor 426 also sends a handshake to system monitor 430 of Node C, also containing its own status but no site token. An interval timer is also set. System monitor 426 of Node A then receives a handshake message from system monitor 428 of Node B, which contains the status of Node B. This information is used to update a status table in Node A. System monitor 426 also receives a handshake message containing Node C's status from system monitor 430, and uses the data therein to update the status table.

When the interval timer set for Node B expires, system monitor 426 of Node A again sends a handshake message to system monitor 428 of Node B with Node A's status and a site token containing Node C's status, as reported in the status table. Likewise, a handshake message is also sent to node C with Node A's status and a site token containing Node B's status when the second interval timer expires. System monitor 428 in Node B responds to Node A's handshake message this time with a handshake message containing its own understanding of Node C's status in a site token. System monitor 426 of Node A then compares Node C's status received from Node B with the C's status entry in its status table. Note that Node A's status table may list Node C as down if any of its previous handshake messages sent to Node C went unacknowledged or unanswered. Therefore, if both the status table and Node B's handshake message indicate that Node C is down, then the system configuration database of Node A is updated to mark Node C as down. Node B, carrying out the exact process as described above, will have also discovered the down status of Node C and updates its system configuration database accordingly.

Takeover processing using a backup node to carry the transactional load of the failed node then begins. To notify processes within the backup node to begin processing transactions of the failed node, the system monitor of the backup node may send a command message to the control point of the same node requesting that the system configuration database be updated to mark the node down, as described above, and that a broadcast message be sent to all processes at the backup node that takeover processing is to begin.

During takeover processing when one or more nodes are down, traffic to the failed node(s) are routed to its backup node. For example in FIG. 8, Node B is down and Node A was previously designated as its backup system. Each process entity in the system also has at least one designated backup process, and traffic is routed to the backup entities. For example, a terminal definition file records the network ownership data of each ATM terminal and each terminal definition file record may have a primary node name and at least one backup node name maintained in the system configuration database.

When a transaction is initiated at an ATM 52' coupled directly to Node B during the takeover operation mode, it is communicated to device handler 80 and router 110 of Node A for processing. Router 110 determines that its system is the backup system for this transaction during takeover mode, and sends the transaction message to authorizer 116. Authorizer 116 also determines that it is the backup process for the particular card definition file (CDF) 118 record for the current transaction, and authorizers the transaction. Authorizer 116 may use a different set of predefined transaction authorization limits during the takeover mode. Authorizer 116 then sends the message to journal 120 for recording the transaction in transaction journal file (TJF) 122 and also writes the transaction to a store and forward file (SAF) 432.

When Node B becomes operational, a restore process 434 communicates database updates to customer account file (CAF) 436 and positive account file (PBF) 438, so that they are updated to reflect transactions occurred during the takeover period.

The description of the present invention above is generally set in the context of electronic funds and information transfer as an example. However, the present invention is applicable to any application programs which require on-line communications with outside devices or systems. Other examples include application for an electronic benefits transfer system, automated on-line ticketing, and credit card point-of-sale transactions.

Although the present invention and its advantages have been described in detail, it should be understood that various changes, substitutions and alterations can be made therein without departing from the spirit and scope of the invention as defined by the appended claims.

What is claimed is:

1. A fail-safe event-driven transaction processing system, comprising:
   at least one system node having a plurality of application processes for processing transactions initiated by a plurality of outside devices;
   a data communications system supplying a plurality of messaging entities and services to said plurality of application processes for routing, transmitting and receiving messages to and from one another;
   a system configuration database storing each entity and process and their respective backup entities; and
   a system monitor residing at each system node for monitoring and communicating the failure status of each system node to one another.

2. The system, as set forth in claim 1, wherein each system node further comprises:
   at least one application database used in processing said transactions; and
   at least one backup application database.

3. The system, as set forth in claim 2, wherein said application processes further comprise a database synchronization process for transmitting modifications to said application database to its backup application database.

4. The system, as set forth in claim 2, wherein said application processes further comprise a database restore process for transmitting transactions processed by a backup system node to an application database residing in a down system node, after said down system node resumes operations.

5. The system, as set forth in claim 4, wherein said transactions processed by said backup system node is stored in a predefined database on said backup system until said down system node resumes operations and said database restore process successfully transmits said stored transactions thereto.

6. The system, as set forth in claim 1, wherein said system monitor residing at each node comprises a handshake protocol for polling system monitors residing at other system nodes for the failure status of the other system nodes.

7. The system, as set forth in claim 1, further comprising a status table accessible by said system monitor for recording the failure status of each system node.

8. The system, as set forth in claim 1, wherein said application processes include an authorizer process for receiving a message containing a request for a transaction, and authorizing said request.

9. The system, as set forth in claim 1, wherein said application processes include a router process for receiving a message containing a request for a transaction and determining a destination for said message.

10. The system, as set forth in claim 1, wherein said application processes include a journal process for recording each transaction.

11. The system, as set forth in claim 1, further comprising:
   a primary communications link between each system node and at least one other system node; and
   a backup communications link between each system node and at least one other system node, said backup communications link being operational when said primary communications link fails.

12. The system, as set forth in claim 11, further comprising a control communications link between each system node for communicating control messages.

13. A method for operating a fail-safe event-driven transaction processing system, comprising the steps of:
   recording in a system configuration database a logical identifier, a physical address, and failure status for each node in the system;
   polling all nodes in the system for its status and its understanding of the failure status of all other nodes in the system; and
   routing processing messages to a backup node in response to determining a node as being down.

14. The method, as set forth in claim 13, wherein the polling step comprises the steps of:
   sending a handshake message from each node to each other node in the system, the handshake message containing the failure status of sender node;
   receiving the handshake message, updating an entry of the sender node's failure status in a status table, and replying by sending a handshake message to the sender node, the handshake message containing the failure status of receiver node;

again sending a handshake message from each node to each other node in the system, the handshake message containing the failure status of the sender node and all nodes in the system other than an intended receiver of the handshake message; and receiving the handshake message, comparing the failure status of all nodes in the message with corresponding entries in the status table.

15. The method, as set forth in claim 14, wherein the polling step further comprises the steps of:

marking a node as being down if both status table and a predetermined number of nodes also indicates that node as being down in the handshake message in the comparing step; and notifying a node designated as a backup node to begin takeover processing of the downed node's process load.

16. The method, as set forth in claim 13, further comprising the steps of:

performing takeover processing of the downed node's process load;

storing transactions performed during takeover processing;

forwarding the stored transactions to the downed node when it resumes operations; and updating the downed node's database to reflect transactions performed during takeover processing.

17. The method, as set forth in claim 16, wherein the transaction storing step comprises the step of storing modifications to a selected set of databases used in takeover processing.

18. The method, as set forth in claim 13, further comprising the steps of:

noting modifications made to data in at least one selected application database;

forwarding said modifications to a backup application database;

making the same modifications to data stored in a backup application database.

19. The method, as set forth in claim 18, wherein said noting, forwarding, and modification making steps are made periodically to synchronize the data stored in the selected application database and its backup application database.

* * * * *